(12) United States Patent
Vesely et al.

(10) Patent No.: US 11,394,043 B2
(45) Date of Patent: Jul. 19, 2022

(54) SYSTEM AND METHOD FOR INCREASING THE EFFICIENCY FOR A SOLID OXIDE FUEL CELL SYSTEM

(71) Applicant: Cummins Power Generation IP, Inc., Minneapolis, MN (US)

(72) Inventors: Charles J. Vesely, Andover, MN (US); Xin G. Li, Blaine, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 276 days.

(21) Appl. No.: 16/513,277

(22) Filed: Jul. 16, 2019

(65) Prior Publication Data
US 2020/0014045 A1    Jan. 9, 2020

Related U.S. Application Data

(63) Continuation of application No. 14/340,735, filed on Jul. 25, 2014, now abandoned.

(51) Int. Cl.
| | |
|---|---|
| *H01M 8/04291* | (2016.01) |
| *H01M 8/0612* | (2016.01) |
| *H01M 8/04014* | (2016.01) |
| *H01M 8/04223* | (2016.01) |
| *H01M 8/04007* | (2016.01) |
| *H01M 8/04119* | (2016.01) |
| *H01M 8/12* | (2016.01) |

(52) U.S. Cl.
CPC ..... *H01M 8/0618* (2013.01); *H01M 8/04022* (2013.01); *H01M 8/04074* (2013.01); *H01M 8/04164* (2013.01); *H01M 8/04171* (2013.01); *H01M 8/04223* (2013.01); *H01M 8/04291* (2013.01); *H01M 2008/1293* (2013.01)

(58) Field of Classification Search
CPC ...... H01M 8/06; H01M 8/04; H01M 8/04291; H01M 8/04074; H01M 8/04164; H01M 8/04171
See application file for complete search history.

(56) References Cited

U.S. PATENT DOCUMENTS

| | | |
|---|---|---|
| 5,432,710 A | 7/1995 | Ishimaru et al. |
| 2003/0175572 A1 | 9/2003 | Bette et al. |
| 2003/0190513 A1 | 10/2003 | Meissner et al. |
| 2003/0219635 A1 | 11/2003 | Lee et al. |
| 2006/0251934 A1 | 11/2006 | Valensa et al. |
| 2010/0047634 A1 | 2/2010 | Nguyen et al. |

OTHER PUBLICATIONS

"Solid oxide fuel cell," Wikipedia, http://en.wikipedia.org/wiki/Solid_Oxide_fuel_cell, Dec. 1, 2011, 9 pages.
"Thermoelectric cooling," Wikipedia, http://en.wikipedia.org/siki/Peltier_cooler, Dec. 1, 2011, 3 pages.

*Primary Examiner* — James Lee
(74) *Attorney, Agent, or Firm* — Foley & Lardner LLP

(57) ABSTRACT

A system and method are provided for increasing efficiency of a solid oxide fuel cell (SOFC) system by recapturing water via a condensate extraction system that extracts water from a hot cathode exhaust flow of the SOFC stack. Further, the SOFC system can include a radiant heater which has a fuel inlet, an air intake, and an exhaust outlet independent and separate from the power generating components in the SOFC system. The radiant heater can bring the SOFC stack up to operating temperature quickly and/or maintain near operational mode temperatures of the SOFC stack during a hibernation mode.

11 Claims, 5 Drawing Sheets

SYSTEM AND METHOD FOR INCREASING THE EFFICIENCY FOR A SOLID OXIDE FUEL CELL SYSTEM

CROSS-REFERENCE TO RELATED APPLICATIONS

The present application is a continuation of and claims the benefit of priority to co-pending U.S. application Ser. No. 14/340,735, filed Jul. 25, 2014, the entire contents of which are incorporated herein by reference.

FIELD

This disclosure relates to increasing the efficiency of solid oxide fuel cell (SOFC) system.

BACKGROUND OF THE INVENTION

Under normal operation, a typical SOFC system maintains a system operating temperature of approximately 700° C. For the high temperature fuel cell system to become operational, the system typically requires significant startup time ranging anywhere between 1 to 4 hours to reach the operating temperature from near ambient environmental conditions.

Generally, in a portable SOFC system, a stack (or hot box) is heated up from the environment using the following two methods. One method burns fuel in a combustor and uses the exhaust from the combustor as a heat source for heating an incoming cold cathode air. Then, the heated cathode air is used to heat up the stack. Another method requires a separate combustor or an electric heater in the stack. The method uses the hot exhaust from the combustor to heat up the stack by convection with the external stack surface.

Further, conventional SOFC system generally uses a reformer to generate usable fuel from a hydrocarbon based (HC) feed stock fuel. The reformer can be operated as an Auto Thermal Reactor (ATR) or a steam reformer, both of which require a source of water for proper operation. A water source independent system is generally required for a portable or remote power system, especially for RV or remote site telecom gensets. In the water source independent system, water can be acquired by condensing water vapors from the exhaust anode fuel of the SOFC stack. At the SOFC stack, an electrochemical conversion process occurs which produces electricity directly from oxidizing the fuel. SOFC stack has a solid oxide or ceramic, electrolyte which requires high operating temperature which results in longer start-up times and mechanical and chemical compatibility issues.

A conventional method for condensing water vapor is to use ambient air with a heat exchanger to cool down the anode exhaust gas and then extract liquid water from that anode exhaust. This method is limited to moderate ambient temperatures, which tend to limit its usefulness in high environmental temperature conditions (e.g., summer).

Conventional methods for heating up a fuel cell stack in a SOFC system from the environment typically have low efficiencies. For example, using the exhaust from the combustor as the heat source for heating up the incoming cold cathode air, a substantial portion of the heat from the exhaust is directly released to environment and not utilized for heating the fuel cell stack. Conventional methods can also suffer from high parasitic loss of power, which can increase the fuel burn rate of the combustor.

In portable SOFC systems, conventional methods for heating up the stack can present a challenge for a battery bank capacity because portable SOFC systems are generally operated without an external power source. Additionally, high condensation rates are required to supply the system needs and achieve a water balance for increasing the efficiency of the SOFC system. The increased level of condensate production cannot be achieved by conventional methods described above at high ambient air temperatures. Thus, there can be a risk of running out of water in conventional SOFC systems absent an external water supply.

SUMMARY OF THE INVENTION

Embodiments disclosed herein increase the efficiency of SOFC system by recapturing water via a condensate extraction system that extracts water from a hot cathode exhaust flow of the SOFC stack. Further, the SOFC system can include a radiant heater which has a fuel inlet, an air intake, and an exhaust outlet independent and separate from the power generating components in the SOFC system. The radiant heater can bring the SOFC stack up to operating temperature quickly and/or maintain near operational mode temperatures of the SOFC stack during a hibernation mode.

Embodiments disclosed herein are directed to achieving the water balance for increasing efficiency of SOFC systems. Embodiments can include a condensate extraction system that cools the hot cathode exhaust flow (about 400° C. typically) using an intake of ambient air through a heat exchanger to extract water as a condensate. The remaining exhaust is then rejoined to the cathode exhaust flow entering the makeup burner. The heat from the heat exchanger is also used to flash the water condensate back to vapor in the incoming air stream, which is then routed into the ATR reformer for use. The cooler of an embodiment is placed in the cathode exhaust stream exiting the heat exchanger to further cool the exhaust and condense water out of the exhaust stream.

In other embodiments, to limit the power draw of the cooler, the temperature of the exhaust stream exiting the heat exchanger is monitored and the cooling is controlled and/or regulated to cool sufficiently enough for condensing the water vapor out. In another embodiment where an absorption chiller is included and used, heat from the main exhaust is used to drive the chilling cycle and cools the exhaust exiting the heat exchanger.

An embodiment of a SOFC system for heating a solid oxide fuel cell comprises a hot box containing a fuel cell; a reformer which provides a reformed fuel to the fuel cell; and a condensate chiller mechanism, wherein the condensate chiller mechanism receives anode exhaust from the fuel cell and condenses liquid water from the anode exhaust, vaporizes the liquid water to water vapor, and directs the water vapor to the reformer to increase the amount of water vapor received by the reformer for producing the reformed fuel. In another embodiment the condensate chiller mechanism comprises a Peltier cooler for separating the liquid water from the anode exhaust. In another embodiment, the condensate chiller mechanism comprises a phase change cooler for separating the liquid water from the anode exhaust.

An embodiment of the system further comprises a fuel-based radiant heater, wherein the fuel-based radiant heater for heating the fuel cell, wherein the fuel-based radiant heater directs radiation to the fuel cell to bring the fuel cell to operating temperature at startup and/or maintain a temperature of the fuel cell to near operating temperature during hibernation mode. In an embodiment of the system, the fuel-based radiant heater is a diesel fuel-based radiant heater.

In another embodiment of the system, the fuel-based radiant heater is a directed fuel-based radiant heater.

An embodiment of the system further comprises a fuel inlet for generating electricity from the fuel cell, wherein the fuel-based radiant heater has a radiant heater fuel inlet that is independent and separate from the fuel inlet. Another embodiment of the system further comprises an exhaust outlet for generating electricity from the fuel cell, wherein the fuel-based radiant heater has a radiant heater exhaust outlet that is independent and separate from the exhaust outlet. In another embodiment of the system, the radiant heater exhaust outlet is directed to provide heat to the fuel cell.

An embodiment of the system for heating a solid oxide fuel cell comprises a hot box containing a fuel cell, and a fuel-based radiant heater, wherein the fuel-based radiant heater for heating the fuel cell, wherein the fuel-based radiant heater directs radiation to the fuel cell to bring the fuel cell to operating temperature at startup and/or maintain a temperature of the fuel cell to near operating temperature during hibernation mode.

An embodiment of a method for increasing an efficiency of a SOFC system comprises the steps of directing an anode exhaust from a fuel cell to a condensate chiller; extracting water vapor from the anode exhaust and directing the water vapor to an air intake of a reformer for producing a reformed fuel with an increased water balance; producing the reformed fuel with the increased water balance; and supplying the reformed fuel with the increased water balance to the SOFC fuel cell.

Another embodiment of the method further comprises the step of generating radiation by supplying a fuel to a fuel-based radiant heater, wherein the fuel-based radiant heater directs the radiation to the fuel cell to bring the fuel cell to operating temperature at startup and/or maintain a temperature of the fuel cell to near operating temperature during hibernation mode.

Another embodiment of the method further comprises the step of bringing the fuel cell to operating temperature at startup by generating radiation from a fuel-based radiant heater, wherein the fuel-based radiant heater directs the radiation to the fuel cell.

Another embodiment of the method further comprises the step of maintaining a temperature of the fuel cell at near operating temperature of the fuel cell in hibernation mode by generating radiation from a fuel-based radiant heater, wherein the fuel-based radiant heater generates the radiation and directs the radiation to the fuel cell.

Another embodiment of the method further comprises the step of maintaining a temperature of the fuel cell at near operating temperature of the fuel cell in hibernation mode by generating radiation from a fuel-based radiant heater, wherein the fuel-based radiant heater directs the radiation to the fuel cell.

Another embodiment of the method further comprises the step of bringing the fuel cell to operating temperature at startup by generating radiation from a fuel-based radiant heater, and directing the radiation to the fuel cell.

Another embodiment of the method further comprises the step of maintaining a temperature of the fuel cell at near operating temperature of the fuel cell in hibernation mode by directing heat from radiant heater exhaust from a fuel-based radiant heater to the fuel cell.

Another embodiment of the method further comprises the step of bringing the fuel cell to operating temperature at startup by directing heat from radiant heater exhaust from a fuel-based radiant heater to the fuel cell.

DETAILED DESCRIPTION OF THE PREFERRED EMBODIMENTS

Figure 1:
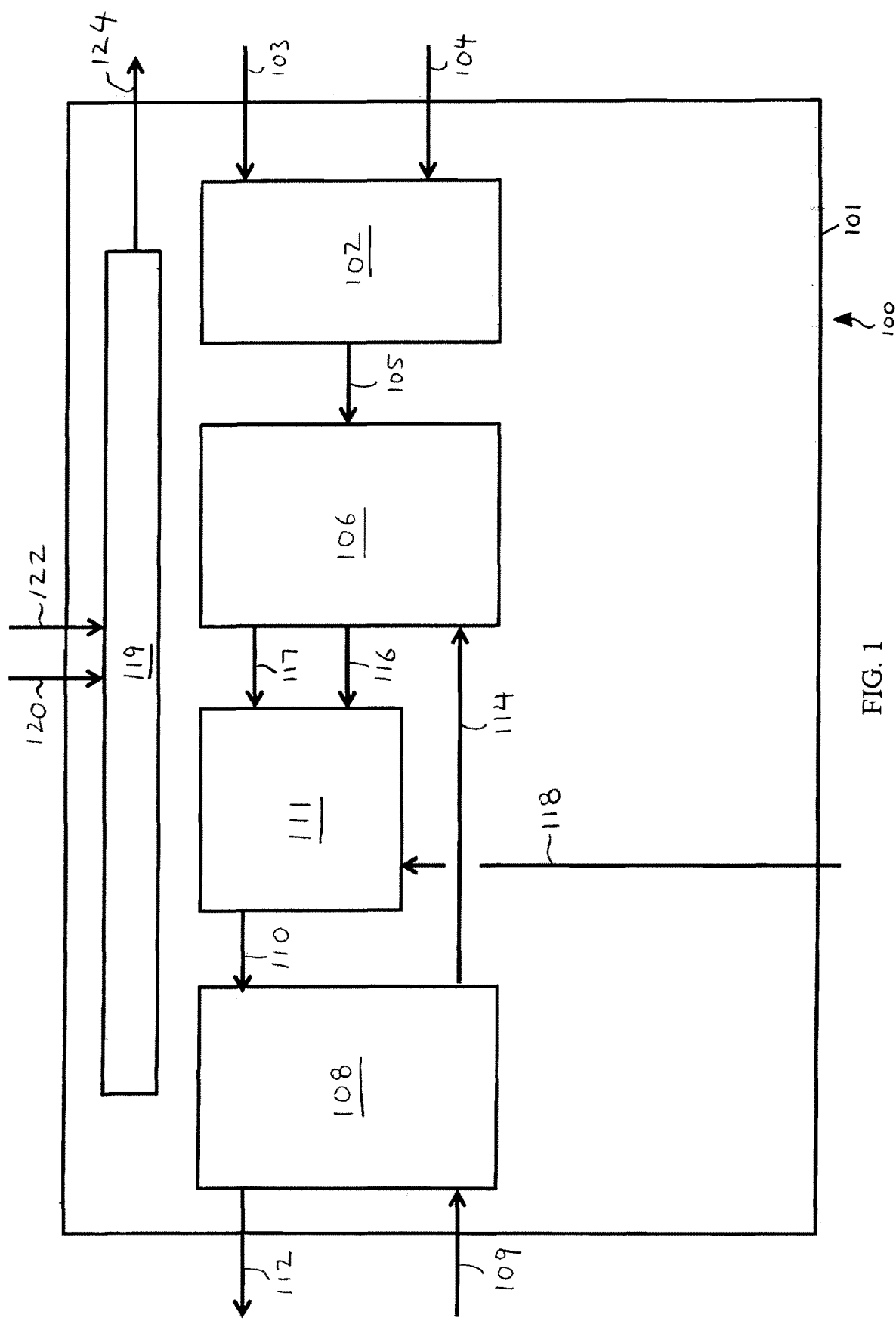
FIG. 1 shows a schematic diagram of a SOFC system including a radiant heater according to an embodiment of the invention.

The present disclosure may be further understood with reference to the following description and the appended drawings, wherein like elements are referred to with the same reference numerals. A system, a method, and a device disclosed herein are directed towards increasing efficiency of a solid oxide fuel cell (SOFC) system by recapturing water via a condensate extraction system that extracts water from a hot cathode exhaust flow of the SOFC stack. Further, the SOFC system can include a radiant heater which has a fuel inlet, an air intake, and an exhaust outlet independent and separate from the power generating components in the SOFC system. The radiant heater can bring the SOFC stack up to operating temperature quickly and/or maintain near operational mode temperatures of the SOFC stack during a hibernation mode.

FIG. 1 shows a schematic diagram of a SOFC system 100 according to an embodiment of the invention. The SOFC system 100 includes an air sealed hot box 101. Inside the hot box 101, the SOFC system 100 contains a reformer 102 which receives anode air 103 and a fuel 104, and provides a supply of reformed fuel 105 (e.g., $H_2$ and CO) to the anode side of the SOFC stack 106. The reformer 102 can be an ATR reformer or a steam reformer, both of which require a source of water for proper operation. The anode air 103 can be at an environmental temperature, such as, but not limited to, around 20° C. In one embodiment, the reformed fuel 105 from the reformer 102 can be at the environmental temperature, such as, but not limited to, around 20° C. The SOFC stack 106 contained inside the hot box 101 receives the supply of the reformed fuel 105.

In the meantime a recuperator 108 contained inside the hot box 101 receives a cathode air 109 for the cathode side of the SOFC stack 106. Generally, the cathode air 109 received by the recuperator 108 can be at the environmental temperature, such as for example, around 20° C. The recuperator 108 heats the received cathode air 109 with hot exhaust 110 from a makeup combustor 111 (also known as unused fuel combustor). For example, the hot exhaust 110 from the makeup combustor 111 can be 850° C., and after the cathode air 109 is heated to hot cathode air temperature of about 700° C., the exhaust 112 can be directed out from the recuperator 108 at about 200° C. The hot cathode air 114 is directed from the recuperator 108 to the cathode side of the SOFC stack 106. From the SOFC stack 106, the cathode exhaust 116 (which can be, for example, at around 400° C.) and the anode exhaust 117 (which can be, for example, at around 400° C.) are directed to the makeup combustor 111, to which makeup fuel 118 can be supplied if needed to burn the unused fuel. The hot exhaust 110 from the makeup combustor 111 is directed to heat the incoming cathode air 109 as described above.

The system 100 includes a radiant heater 119 which radiates heat directed towards components contained in the hot box 101. For example, the heat can be provided as radiation, such as infrared radiation. An embodiment of the radiant heater 119 is a fuel-based radiant heater, which uses carbon-based fuel and burns the fuel in order to generate radiant heat. Examples of the carbon-based fuel include, but are not limited to, diesel fuel, gasoline, methanol, ethanol, natural gas, propane, methane, landfill gas, digester gas, or reformate/syngas from the fuel cell's reformer system 102. Accordingly, an embodiment of the radiant heater 119 is a diesel-based or other carbon-based fuel radiant heater. In an embodiment, the fuel-based radiant heater does not require a battery to generate heat. It is noted that the use of reformate/syngas from the reformer 102 as fuel for the radiant heater 119 is advantageous in that it allows the reformer 102 to be maintained in an active state, ready to supply reformed fuel to the fuel cell system 100 at start up or upon exiting from a hibernation state. The radiant heater 119 includes a fuel inlet 120 that can be independent and separate from the other components in the system 100. The radiant heater 119 includes an air intake 122 that can be independent and separate from the other components in the system 100. The radiant heater 119 includes an exhaust outlet 124 which directs the exhaust from the radiant heater 119 out of the hot box 101. The radiant heater 119 can be used during start-up, heat maintenance, or when system is sealed from the atmosphere and in hibernation mode. The radiant heater 119 allows the hot box 111 to be sealed to the external environment and thermal energy can be transferred by radiation. The heating efficiency can be much higher than conventional SOFC systems because an amount of heat that is exchanged between the SOFC stack 106 and the environment can be significantly reduced due to the directed heating of the SOFC stack 106 by the radiant heater in the closed and sealed hot box 111. Further, because the hot box 111 is sealed from the environment, almost all of the heat from the radiant heater 119 can be absorbed by the SOFC stack 106. For example, the radiant heater 119 can direct radiation via line-of-sight to the SOFC stack 106 to heat the SOFC stack 106. The radiant heater 119 can also raise the general ambient temperature inside the hot box 101. The radiant heater 119 can also direct radiation to heat specific components inside the hot box 101 to increase the overall efficiency of the system 100 during start-up, hibernation, or even during operation.

Further, the system 100 can lower the parasitic power requirements because little or no air flow is required inside the hot box 101 of the system 100. Further, because SOFC stack 106 does not produce electricity until its operating temperature is reached, the radiant heater 119 can also be used as a heat source to either bring the temperature of the system 100 up to near operating temperature when the system 100 is starting up, and/or keep the temperature of the system 100 at near operating temperature in a stand-by hibernation mode (i.e., not producing electrical power from the SOFC stack 106). The raising and/or maintaining the temperature of the system 100 with the radiant heater 119 can be performed while not consuming much fuel (e.g., diesel-based radiant heater can be very efficient). Further, fuel-based radiant heater 119 does not require a draw from a battery bank. A low energy standby mode is particularly important to limit the number of thermal cycles the system 100 must go through. Thus, the system 100 can increase the longevity of operation time, and/or allow the system 100 to be able to produce power quickly on demand from standby mode as compared to the generally used method and/or system. Further, a radiant heater 119 is advantageous over an alternative system of starting up or maintaining operating temperature using a less efficient convection burner. Further still, using the radiant heater 119 is advantageous over an alternative system of maintaining the operation of the SOFC stack so that power production can be performed quickly on demand, because keeping the SOFC stack in operation even when power from it is not needed is very inefficient and can potentially harm or "poison" the SOFC stack media by drawing in unbalanced flows of fuel and oxygen, or by having incomplete combustion products build up. Drawing unbalanced flow of fuel is not an issue for the inactive SOFC system 100 with the sealed hot box 111 and the radiant heater 119 contained in the hot box 111. Further, by using an infrared radiant heater 119, an additional advantage can be achieved. The infrared radiant heater 119 can be a directional heater. Thus, infrared heat can be directed and/or focused to one or more of the components (or particular portions of the one or more of the components). Directing and/or focusing the infrared heat can, for example, increase the overall efficiency of the system 100. For example, using directed infrared radiant heater 119 to heat the SOFC stack 106, the reformer 102, or both, the directed infrared radiant heater 119 can bring up the temperature of the SOFC stack 106, the reformer 102, or both to operating temperature very quickly and/or maintain the temperature of the SOFC stack 106, the reformer 102, or both at near operating temperature. Where the directed infrared radiant heater 119 is, for example, diesel-based, such directed infrared radiant heater 119 can perform the above functions very efficiently due to the efficient burning of the diesel fuel. Further, the directed radiant heater 119 can reduce thermal stress on other components of the system 100 by focusing the heat to only the component(s) in the hot box 111 that require the heating.

Further, the radiant heat from the infrared radiant heater 119 can heat the cathode exhaust 116 and/or the anode exhaust 117. Thus, the makeup combustor 111 which burns additional and/or unused fuel to heat the exhaust 116, 117 to output hot exhaust 110 (for example, at around 850° C.) can operate more efficiently or use less make-up fuel because the heating of the exhaust 116, 117 can be aided by the radiant heat from the radiant heater 119. Accordingly, the radiant heat from the radiant heater 119 can heat the cathode exhaust 116, the anode exhaust 117, the makeup combustor 111, the hot exhaust 110, the SOFC stack 106, or any combinations thereof.

Figure 2:
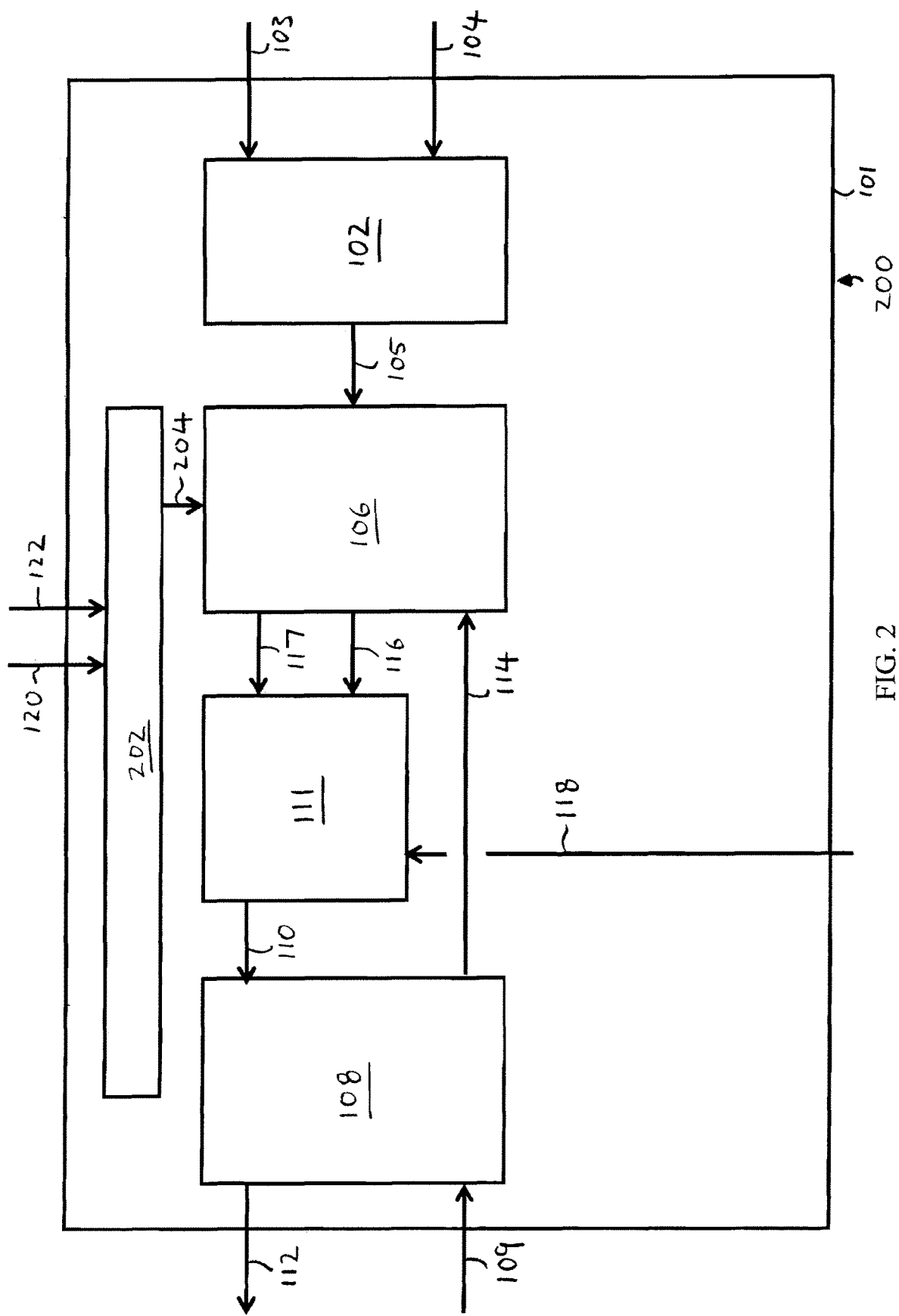
FIG. 2 shows a schematic diagram of a SOFC system including a radiant heater according to an embodiment of the invention.

FIG. 2 shows a system 200 that has several components that are similar to the components in the system 100 shown in FIG. 1. Thus, similar components shown in FIGS. 1 and 2 are referred to with the same reference numerals. The system 200 includes a radiant heater 202 which includes an exhaust outlet 204 which directs the hot exhaust from the radiant heater 202 to the SOFC stack 106. Then, the exhaust is directed out of the hot box 101 through the normal exhaust path of the SOFC system. The radiant heat from the radiant heater 202 can heat the cathode exhaust 116, the anode exhaust 117, the makeup combustor 111, the hot exhaust 110, the SOFC stack 106, or any combinations thereof. Further, the hot exhaust 204 from the radiant heater 202 can be directed inside the hot box 101 to heat the cathode exhaust 116, the anode exhaust 117, the makeup combustor 111, the hot exhaust 110, the SOFC stack 106, or any combinations thereof.

Figure 3:
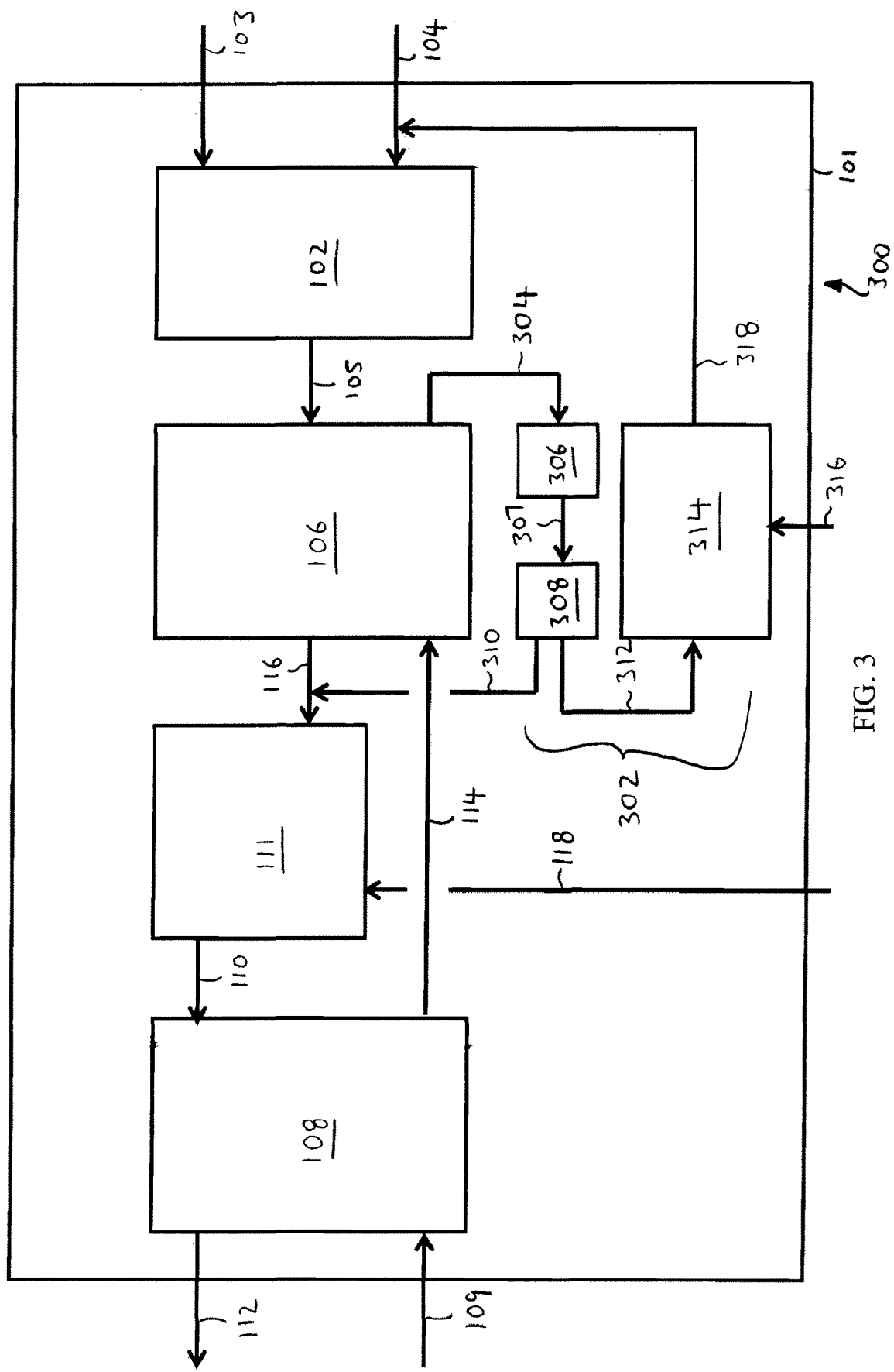
FIG. 3 shows a schematic diagram of a SOFC system including a condensate chiller according to an embodiment of the invention.

FIG. 3 shows a schematic diagram of a SOFC system 300 including a condensate chiller 302. Similar components shown in FIGS. 1 and 3 are referred to with the same reference numerals. The SOFC system 300 includes the air sealed hot box 101. Inside the hot box 101, the SOFC system 300 contains the reformer 102 which receives the anode air 103 and the fuel 104, and provides the reformed fuel 105 (e.g., $H_2$ and CO) to the anode side of the SOFC stack 106. The SOFC stack 106 contained inside the hot box 101 receives the supply of the reformed fuel 105. In the meantime the recuperator 108 contained inside the hot box 101 receives the cathode air 109 for the cathode side of the SOFC stack 106. The recuperator 108 heats the received cathode air 109 with hot exhaust 110 from a makeup combustor 111 (also known as unused fuel combustor). For example, the hot exhaust 110 from the makeup combustor 111 can be 850° C., and after the cathode air 109 is heated to hot cathode air 114 of about 700° C., the exhaust 112 is directed out from the recuperator 108 at about 200° C. The hot cathode air 114 is directed from the recuperator 108 to the cathode side of the SOFC stack 106. From the SOFC stack 106, the cathode exhaust 116 (which can be, for example, at around 400° C.) is directed to the makeup combustor 111. Further, from the SOFC stack 106, the anode exhaust 304 (which can be, for example, at around 400° C.) is directed to a heat exchanger 306. From the heat exchanger 306, the gas 307 is directed to an exhaust cooler 308, which condenses and separates out the liquid water from the gas 307. In an embodiment, the exhaust cooler 308 includes a Peltier cooler. The Peltier cooler uses the Peltier effect to create a heat flux between two materials (the process is also known as thermoelectric cooling). In another embodiment, the exhaust cooler 308 includes an absorption/phase change chiller, which can use heat directed from the SOFC stack in the separation of the liquid water. In an alternative embodiment, a compressor-based refrigerant cooler (such as a Freon based cooler) can be used as an exhaust cooler 308. The gas exhaust 310 separated from the gas 307 at the exhaust cooler 308 is directed to the cathode exhaust 116. Liquid water condensate 312 separated from the gas 307 at the exhaust cooler 308 is directed to a vaporizer 314. The vaporizer 314 is supplied with air 316 from the environment and can vaporize the liquid water condensate 312 to water vapor 318, in part, in one embodiment, by using heat reclaimed by heat exchanger 306. The water vapor 318 can then be directed to combine with the anode air 103 and/or supplied to the reformer 102 to increase the amount of $H_2O$ supplied to the reformer for balancing the water supply to the SOFC stack. Water balancing can achieve efficient generation of reformed fuel 105 that is directed to the SOFC stack 106. Accordingly, the system 100 can increase an overall efficiency of the system 300 over conventional SOFC systems.

Figure 4:
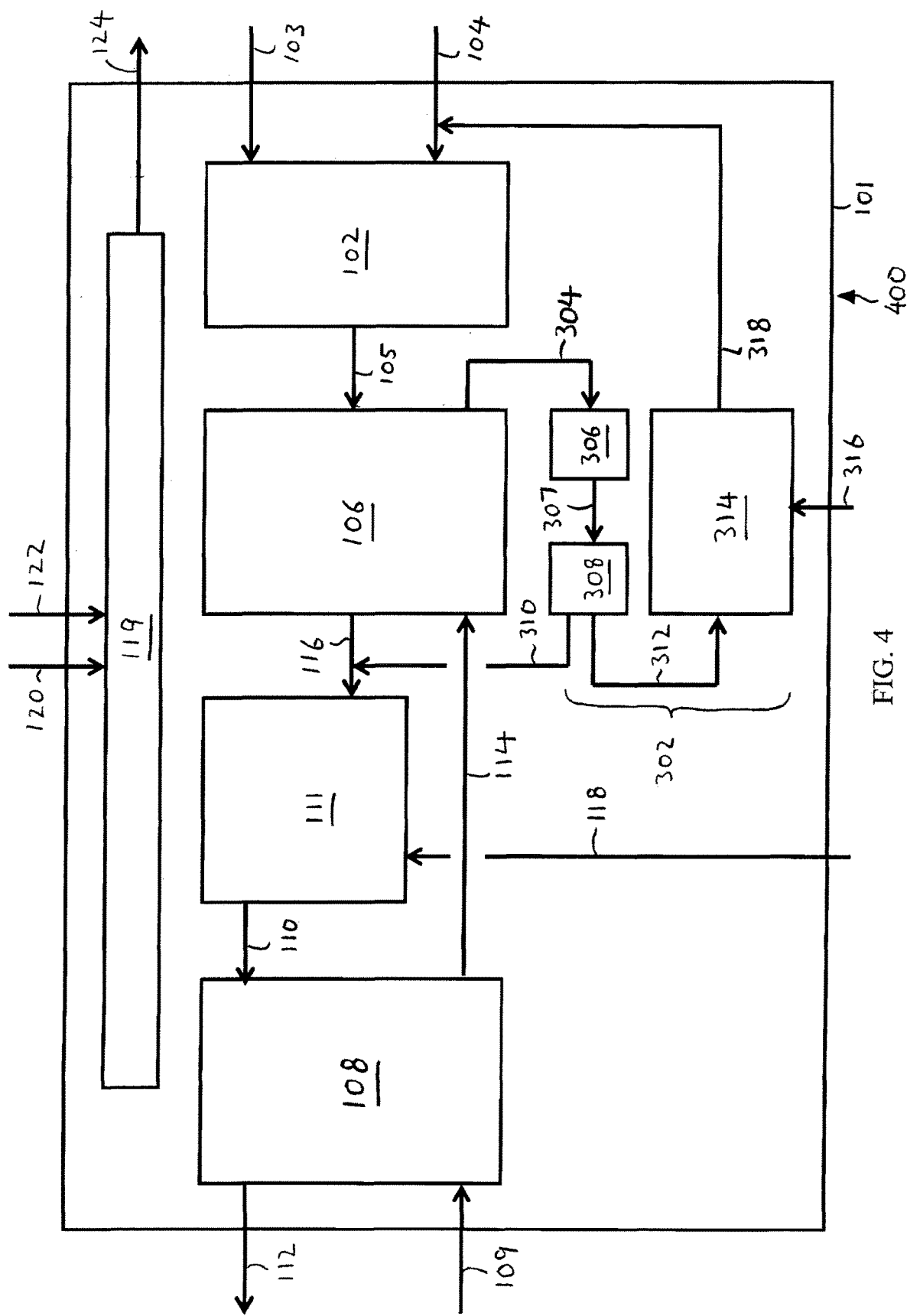
FIG. 4 shows a schematic diagram of a SOFC system according to an embodiment of the invention.
Figure 5:
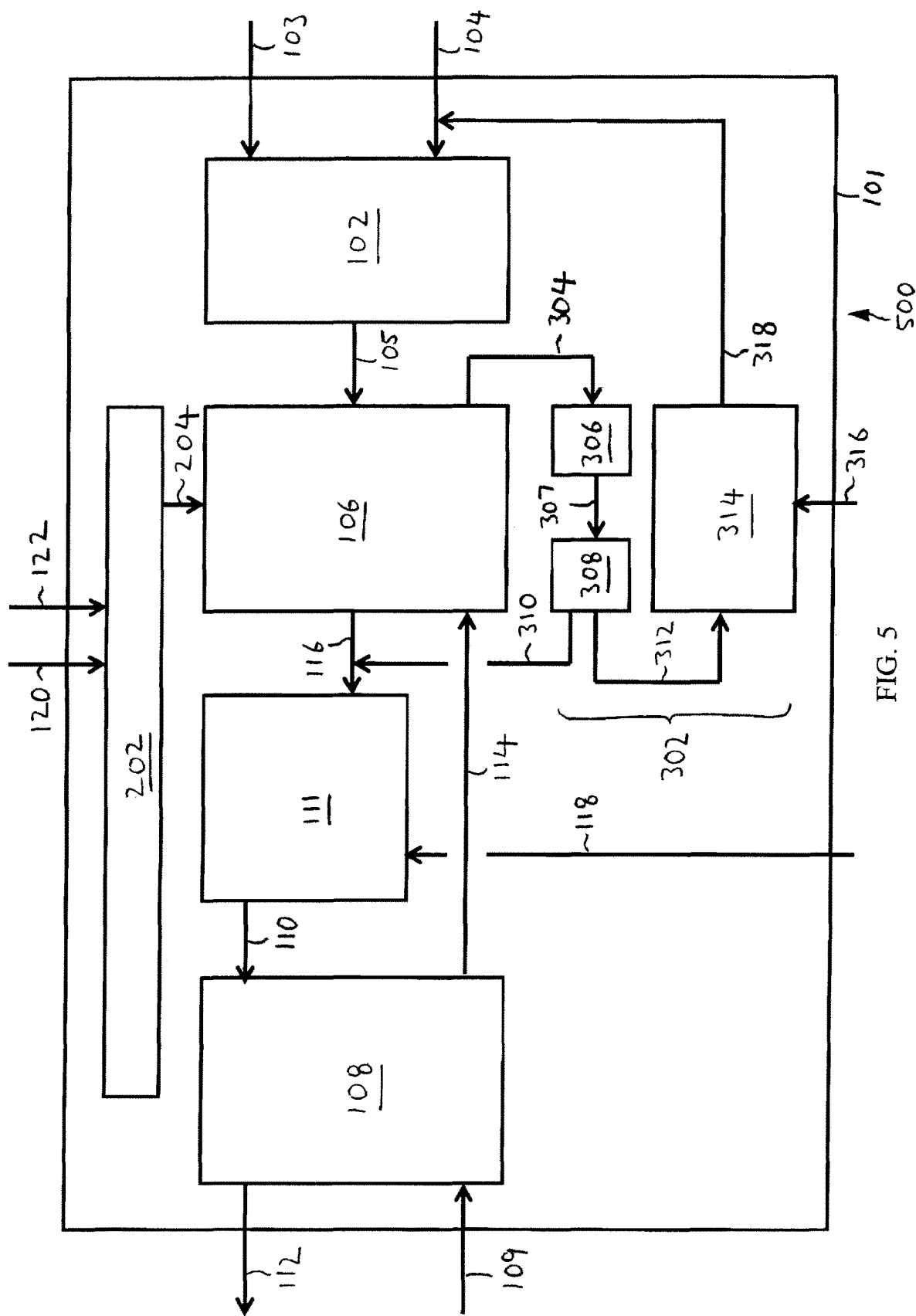
FIG. 5 shows a schematic diagram of a SOFC system according to another embodiment of the invention.

In a further embodiment, a radiant heater 119 can be included with a SOFC system. FIG. 4 shows an embodiment of a SOFC system 400 which can include a condensate chiller 302 and the radiant heater 119. Similar components in FIGS. 1, 3, and 4 are referred to with the same reference numerals. The radiant heater 119 can operate in the manner discussed above (referring to FIG. 1). FIG. 5 shows another embodiment of a SOFC system 500 which includes a condensate chiller 302 and a radiant heater 202. The radiant heater 202 can operate in the manner discussed above (referring to FIG. 2), exhausting the radiant heater 202 through the SOFC stack 106 and associated SOFC exhaust path. Similar components shown in FIGS. 2, 3, and 4 are referred to with the same reference numerals.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A solid oxide fuel cell system, comprising:
a hot box containing a fuel cell;
a reformer configured to provide reformed fuel to the fuel cell; and
a condensate chiller mechanism configured to receive anode exhaust from the fuel cell and to condense liquid water from the anode exhaust, wherein the condensate chiller mechanism comprises a phase change cooler configured to separate the liquid water from the anode exhaust, and wherein the phase change cooler comprises an absorption chiller that is disposed within the hot box, the absorption chiller configured to utilize heat from the fuel cell or from exhaust of the fuel cell to condense the liquid water from the anode exhaust.

2. The system of claim 1, wherein the condensate chiller mechanism is configured to vaporize the liquid water to water vapor, and to direct the water vapor to the reformer.

3. The system of claim 1, further comprising:

a heat exchanger, wherein the absorption chiller is configured to utilize heat from the exhaust of the fuel cell to effectuate a chilling cycle and to cool exhaust exiting from the heat exchanger.

4. The system of claim 1, further comprising:

a fuel-based radiant heater, wherein the fuel-based radiant heater directs radiation to the fuel cell to heat the fuel cell.

5. The system of claim 4, wherein the fuel-based radiant heater is one of a diesel, gasoline, methanol, ethanol, natural gas, propane, methane, landfill gas, digester gas, reformate, or syngas fuel-based radiant heater.

6. The system of claim 4, wherein the fuel-based radiant heater is a directed fuel-based radiant heater.

7. The system of claim 4, further comprising a fuel inlet, wherein the fuel-based radiant heater has a radiant heater fuel inlet that is independent and separate from a flow path of the fuel cell.

8. The system of claim 4, wherein the fuel-based radiant heater has a radiant heater exhaust outlet that is independent and separate from a flow path of the fuel cell.

9. The system of claim 8, wherein the radiant heater exhaust outlet is directed to provide heat to the fuel cell.

10. The system of claim 1, wherein an outlet of the absorption chiller is coupled to a cathode exhaust from the fuel cell.

11. The system of claim 2, further comprising a heat exchanger coupled to an inlet of the condensate chiller mechanism, wherein the condensate chiller mechanism is configured to use heat reclaimed by the heat exchanger to vaporize the liquid water.

\* \* \* \* \*